(12) United States Patent
Ojima et al.

(10) Patent No.: US 10,411,280 B2
(45) Date of Patent: Sep. 10, 2019

(54) FUEL CELL SYSTEM AND METHOD OF SHUTTING DOWN THE SAME

(71) Applicant: HONDA MOTOR CO., LTD., Tokyo (JP)

(72) Inventors: Kuniaki Ojima, Wako (JP); Kenji Taruya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 15/603,451

(22) Filed: May 24, 2017

(65) Prior Publication Data

US 2017/0346117 A1    Nov. 30, 2017

(30) Foreign Application Priority Data

May 30, 2016   (JP) .................... 2016-107492

(51) Int. Cl.
*H01M 8/04955*   (2016.01)
*H01M 8/04228*   (2016.01)
(Continued)

(52) U.S. Cl.
CPC ... *H01M 8/04955* (2013.01); *H01M 8/04228* (2016.02); *H01M 8/04303* (2016.02);
(Continued)

(58) Field of Classification Search
CPC ......... H01M 8/04895; H01M 8/04753; H01M 8/04201
See application file for complete search history.

(56) References Cited

U.S. PATENT DOCUMENTS 8,043,753 B2 * 10/2011 Mohri ............... H01M 8/04126
429/413
9,093,679 B2 * 7/2015 Morita ............... H01M 8/04388
(Continued)

FOREIGN PATENT DOCUMENTS

| JP | 2003-115317 | 4/2003 |
| JP | 2013-149538 | 8/2013 |
| JP | 2014-002930 | 1/2014 |

OTHER PUBLICATIONS

Japanese Office Action for corresponding JP Application No. 2016-107492, dated Feb. 20, 2018 (w/ English machine translation).

*Primary Examiner* — Abdullah A Riyami
*Assistant Examiner* — Nader J Alhawamdeh
(74) *Attorney, Agent, or Firm* — Mori & Ward, LLP

(57) ABSTRACT

A method of shutting down a fuel cell system includes a fuel cell includes generating power via an electrochemical reaction between a fuel gas and an oxidant gas. A shutdown command is output to the fuel cell to stop generating power. The fuel cell is controlled to continue generating power during an oxygen consumption process to consume oxygen in the oxidant gas remaining in a cathode system of the fuel cell even when the shutdown command is output to the fuel cell. At least one of voltage, current, and power output from the fuel cell is detected during the oxygen consumption process. Whether an abnormality occurs during the oxygen consumption process is determined based on at least one of the voltage, the current, and the power. The fuel cell is controlled to stop generating power during the oxygen consumption process when it is determined that abnormality occurs.

12 Claims, 9 Drawing Sheets

(51) Int. Cl.

| | |
|---|---|
| *H01M 8/04303* | (2016.01) |
| *H01M 8/04537* | (2016.01) |
| *H01M 8/04664* | (2016.01) |
| *H01M 8/04858* | (2016.01) |
| *H01M 8/04746* | (2016.01) |

(52) U.S. Cl.
CPC ... *H01M 8/04552* (2013.01); *H01M 8/04559* (2013.01); *H01M 8/04582* (2013.01); *H01M 8/04589* (2013.01); *H01M 8/04611* (2013.01); *H01M 8/04619* (2013.01); *H01M 8/04671* (2013.01); *H01M 8/04679* (2013.01); *H01M 8/04753* (2013.01); *H01M 8/04902* (2013.01); *H01M 2250/20* (2013.01)

(56) References Cited

U.S. PATENT DOCUMENTS

| | | | |
|---|---|---|---|
| 9,640,818 B2* | 5/2017 | Furuyama | H01M 8/0488 |
| 2008/0187790 A1* | 8/2008 | Kamihara | H01M 8/04231 |
| | | | 429/429 |
| 2012/0015257 A1* | 1/2012 | Arisawa | B60K 1/04 |
| | | | 429/400 |
| 2012/0077102 A1* | 3/2012 | Morita | H01M 8/04388 |
| | | | 429/429 |
| 2013/0095402 A1* | 4/2013 | Furuyama | H01M 8/0488 |
| | | | 429/427 |
| 2013/0196240 A1* | 8/2013 | Furusawa | H01M 8/04231 |
| | | | 429/429 |
| 2014/0080018 A1* | 3/2014 | Ohgami | H01M 8/04097 |
| | | | 429/415 |
| 2014/0162151 A1* | 6/2014 | Mohri | H01M 8/04835 |
| | | | 429/413 |

* cited by examiner

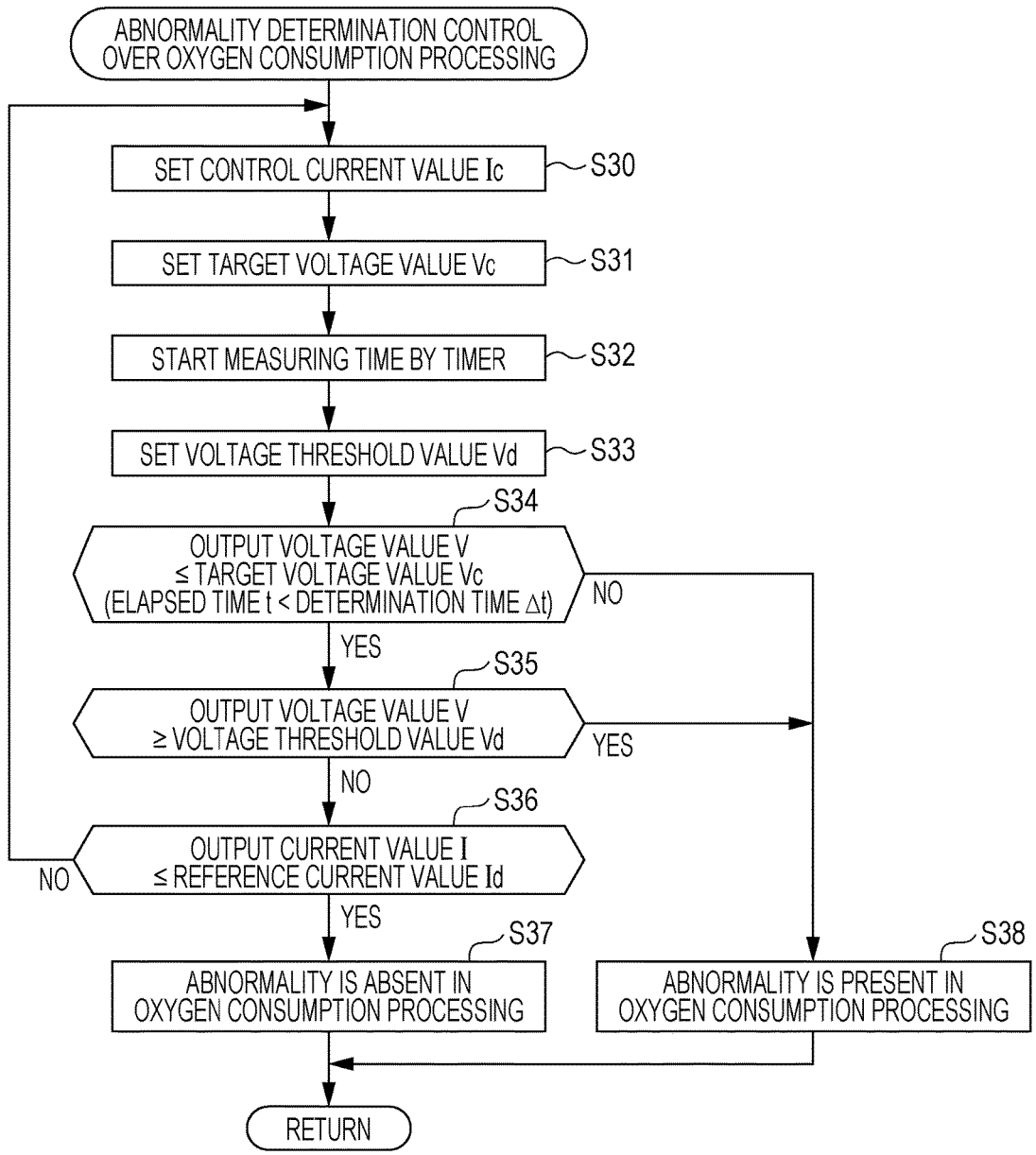

FUEL CELL SYSTEM AND METHOD OF SHUTTING DOWN THE SAME

CROSS-REFERENCE TO RELATED APPLICATION

The present application claims priority under 35 U.S.C. § 119 to Japanese Patent Application No. 2016-107492, filed May 30, 2016, entitled "Fuel Cell System and Method of Shutting Down The Same." The contents of this application are incorporated herein by reference in their entirety.

BACKGROUND

1. Field

The present disclosure relates to a fuel cell system and to a method of shutting down the fuel cell system.

2. Description of the Related Art

When a fuel cell system of this type is shut down, supply of fuel gas and oxidant gas to a fuel cell is stopped. At this point, the oxidant gas remains in the cathode side of the fuel cell (an oxidant gas flow path for introducing the oxidant gas to the cathode electrode of the fuel cell). When the oxygen in the oxidant gas is left remaining in the cathode electrode of the fuel cell, the catalyst included in the fuel cell may deteriorate and the durability of the fuel cell may be reduced.

For instance, Japanese Unexamined Patent Application Publication No. 2013-149538 discloses a technical idea in which when a fuel cell system is shut down, power generation of the fuel cell is continued in a state where supply of oxidant gas to the cathode side of the fuel cell is stopped, and the oxygen consumption processing is thereby performed to cause the oxygen in the oxidant gas on the cathode side of the fuel cell to be consumed. In addition, the fuel cell system determines based on the output voltage of the fuel cell whether or not the oxygen on the cathode side of the fuel cell has been sufficiently consumed.

SUMMARY

According to one aspect of the present invention, a method of shutting down a fuel cell system including a fuel cell includes generating power via an electrochemical reaction between a fuel gas and an oxidant gas. A shutdown command is output to the fuel cell to stop generating power. The fuel cell is controlled to continue generating power during an oxygen consumption process to consume oxygen in the oxidant gas remaining in a cathode system of the fuel cell even when the shutdown command is output to the fuel cell. At least one of voltage, current, and power output from the fuel cell is detected during the oxygen consumption process. Whether an abnormality occurs during the oxygen consumption process is determined based on at least one of the voltage, the current, and the power. The fuel cell is controlled to stop generating power during the oxygen consumption process when it is determined that abnormality occurs.

According to another aspect of the present invention, a fuel system includes a fuel cell, at least one detector, and circuitry. The fuel cell is to generate power via an electrochemical reaction between a fuel gas and an oxidant gas. The at least one detector is to detect at least one of voltage, current, and power output from the fuel cell during an oxygen consumption process. The circuitry is configured to output a shutdown command to the fuel cell to stop generating power. The circuitry is configured to control the fuel cell to continue generating power during the oxygen consumption process to consume oxygen in the oxidant gas remaining in a cathode system of the fuel cell even when the circuitry outputs the shutdown command to the fuel cell. The circuitry is configured to determine whether an abnormality occurs during the oxygen consumption process based on at least one of the voltage, the current, and the power. The circuitry is configured to control the fuel cell to stop generating power during the oxygen consumption process when the circuitry determines that abnormality occurs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 is a flowchart illustrating a method of shutting down the fuel cell system illustrated in FIG. 8.

DESCRIPTION OF THE EMBODIMENTS

Figure 1:
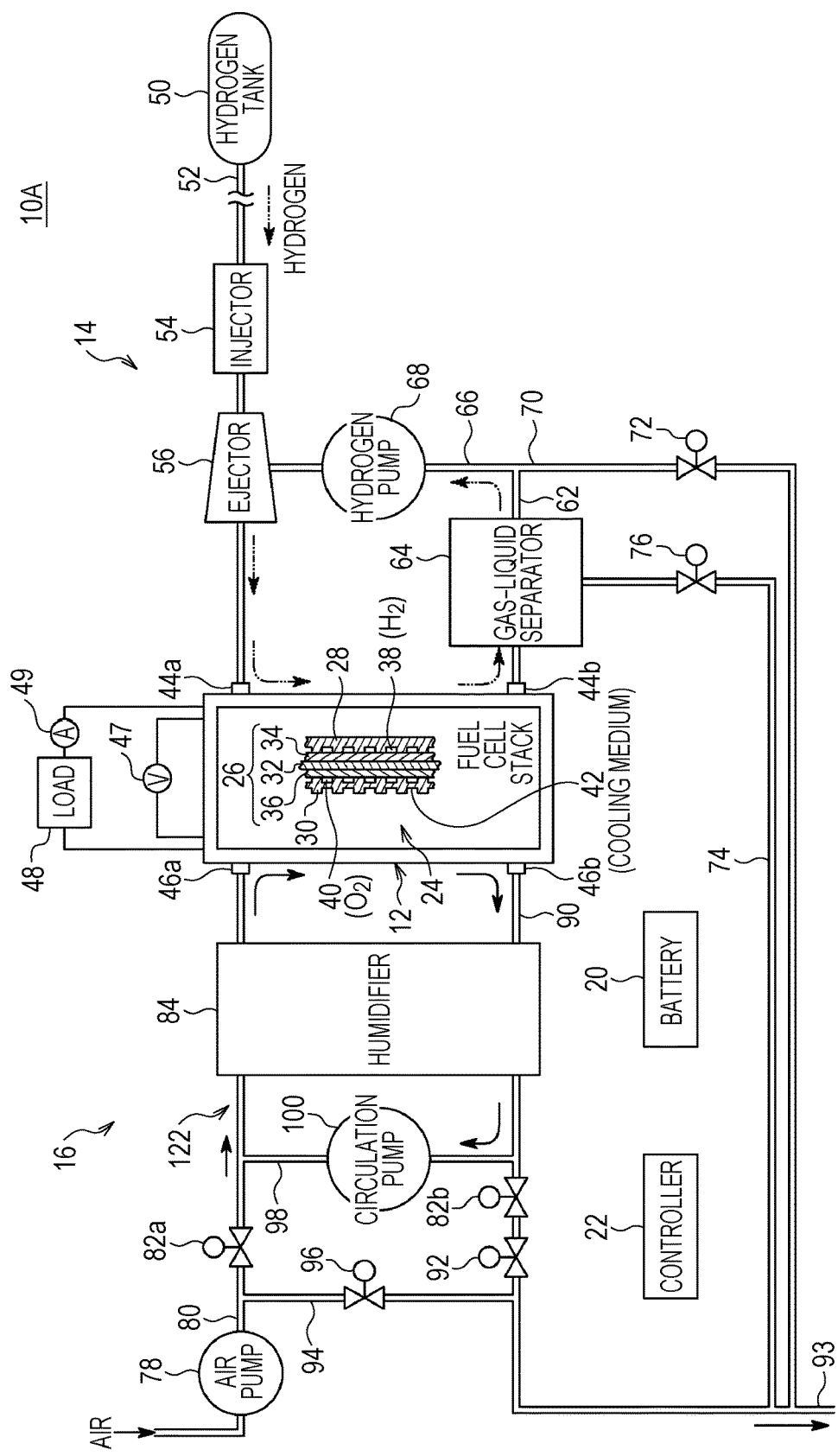
FIG. 1 is a schematic configuration diagram schematically illustrating a fuel cell system according to a first embodiment of the present disclosure.

The embodiments will now be described with reference to the accompanying drawings, wherein like reference numerals designate corresponding or identical elements throughout the various drawings.

Hereinafter, a fuel cell system and a method of shutting down the fuel cell system according to the present disclosure will be described by illustrating preferred embodiments with reference to the accompanying drawings.

(First Embodiment)

As illustrated in FIG. 1, a fuel cell system 10A according to a first embodiment of the present disclosure is mounted in a fuel cell vehicle (not illustrated) such as a fuel cell electric automobile.

The fuel cell system 10A includes a fuel cell stack (fuel cell) 12. The fuel cell stack 12 includes a fuel gas supply device 14 that supplies fuel gas, for instance, hydrogen gas, an oxidant gas supply device 16 that supplies oxidant gas, for instance, air, and a cooling medium supply device (not illustrated) that supplies a cooling medium. The fuel cell system 10A further includes a battery 20 which serves as an energy storage device, and a controller 22 (circuitry 22) which serves as a system control device.

In the fuel cell stack 12, multiple power generation cells 24 are stacked in a horizontal direction or a vertical direction. In each of the power generation cells 24, a membrane electrode assembly 26 is interposed between a first separator 28 and a second separator 30. The first separator 28 and the second separator 30 are composed of a metal separator or a carbon separator.

The membrane electrode assembly 26 includes, for instance, a solid polymer electrolyte membrane 32 which is a thin perfluorosulfonic acid membrane impregnated with water, and an anode electrode 34 and a cathode electrode 36 between which the solid polymer electrolyte membrane 32 is interposed. For the solid polymer electrolyte membrane 32, a hydrocarbon (HC)-based electrolyte in addition to a fluorine-based electrolyte is used.

The first separator 28 is provided with a hydrogen gas flow path (fuel gas flow path) 38 for introducing hydrogen gas to the anode electrode 34, between the electrolyte membrane electrode assembly 26 and the first separator 28. The second separator 30 is provided with an air flow path 40 for supplying air to the cathode electrode 36, between the electrolyte membrane electrode assembly 26 and the second separator 30. A cooling medium flow path 42 for flowing a cooling medium is provided between the first separator 28 and the second separator 30 adjacent to each other.

The fuel cell stack 12 is provided with a hydrogen gas inlet 44a, a hydrogen gas outlet 44b, an air inlet 46a, and an air outlet 46b. The hydrogen gas inlet 44a is through in each power generation cell 24 in its stacking direction, and communicates with the supply side of the hydrogen gas flow path 38. The hydrogen gas outlet 44b is through in each power generation cell 24 in its stacking direction, and communicates with the discharge side of the hydrogen gas flow path 38.

The air inlet 46a is through in each power generation cell 24 in its stacking direction, and communicates with the supply side of the air flow path 40. The air outlet 46b is through in each power generation cell 24 in its stacking direction, and communicates with the discharge side of the air flow path 40.

The fuel cell stack 12 is provided with a voltmeter 47 (a detector) that detects an output voltage value V. The wire between the fuel cell stack 12 and a load 48 is provided with an ammeter 49 (a detector) that detects an output current value I of the fuel cell stack 12. As the load 48, for instance, a motor for driving (not illustrated) may be listed. A detection value of the voltmeter 47 and a detection value of the ammeter 49 are transmitted to the controller 22.

The fuel gas supply device 14 includes a hydrogen tank 50 that stores high-pressure hydrogen, and the hydrogen tank 50 communicates with the hydrogen gas inlet 44a of the fuel cell stack 12 via a hydrogen gas supply path (fuel gas supply path) 52. The hydrogen gas supply path 52 supplies hydrogen gas to the fuel cell stack 12.

The hydrogen gas supply path 52 is provided with an injector 54 and an ejector 56 in series. The injector 54 is a flow rate regulating valve that can regulate the flow rate of a fuel gas flowing through the hydrogen gas supply path 52. The ejector 56 sucks the hydrogen exhaust gas (fuel exhaust gas) of the later-described hydrogen circulation flow path 66 utilizing the hydrogen gas introduced from the injector 54, and mixes the hydrogen exhaust gas with the hydrogen gas to discharge the mixed gas to the downstream side.

The hydrogen gas outlet 44b of the fuel cell stack 12 communicates with a hydrogen gas discharge path 62. The hydrogen gas discharge path 62 guides hydrogen exhaust gas from the fuel cell stack 12, the hydrogen exhaust gas being hydrogen gas which has been at least partially used in the anode electrode 34. The hydrogen gas discharge path 62 is connected to a gas-liquid separator 64 as well as to the ejector 56 via a hydrogen circulation flow path 66 which branches off downstream of the gas-liquid separator 64. The hydrogen pump 68 is provided with the hydrogen circulation flow path 66. The hydrogen pump 68 circulates the hydrogen exhaust gas, which has been discharged to the hydrogen gas discharge path 62, to the hydrogen gas supply path 52 through the hydrogen circulation flow path 66.

The downstream side of the hydrogen gas discharge path 62 communicates with one end of a purge flow path 70, and a purge valve 72 is provided at a midpoint on the purge flow path 70. The bottom of the gas-liquid separator 64 is connected to one end of a drain flow path 74 for discharging fluid mainly containing a liquid component. A train valve 76 is disposed at a midpoint on the drain flow path 74.

The oxidant gas supply device 16 includes an air pump 78 that compresses air from the atmosphere and supplies the air, and the air pump 78 is disposed in an air supply path (oxidant gas supply path) 80. The air supply path 80 guides air to the fuel cell stack 12.

The air supply path 80 communicates with the air inlet 46a of the fuel cell stack 12. A supply side on-off valve (inlet sealing valve) 82a and a humidifier 84 are disposed on the downstream side of the air pump 78 on the air supply path 80.

The air outlet 46b of the fuel cell stack 12 communicates with an air discharge path (oxidant gas discharge path) 90. On the air discharge path 90, the humidifier 84 that exchanges water and heat between supply air and discharge air, a discharge side on-off valve (outlet sealing valve) 82b and a back pressure valve 92 are disposed. The air discharge path 90 discharges discharge air (oxidant exhaust gas) from the fuel cell stack 12, the discharge air being air which has been at least partially used in the cathode electrode 36. The downstream side of the air discharge path 90 is connected to the other end of the purge flow path 70 and the other end of the drain flow path 74, and constitutes a diluter 93.

The air supply path 80 and the air discharge path 90 communicate with each other via a bypass flow path 94. One end of the bypass flow path 94 is connected to a point between the air pump 78 and the supply side on-off valve 82a on the air supply path 80, and the other end of the bypass flow path 94 is connected to the downstream side of the back pressure valve 92 on the air discharge path 90.

The bypass flow path 94 is provided with a bypass flow rate regulating valve 96 that regulates the flow rate of air flowing through the bypass flow path 94. Also, the air supply path 80 and the air discharge path 90 communicate with each other via an air circulation flow path 98. One end of the air circulation flow path 98 is connected to a point between the supply side on-off valve 82a and the humidifier 84 on the air supply path 80, and the other end of the air circulation flow path 98 is connected to a point between the humidifier 84 and the discharge side on-off valve 82b on the air discharge path 90. A circulation pump 100 is disposed on the air circulation flow path 98. The circulation pump 100 circulates discharge air, which has been discharged to the air discharge path 90, to the air supply path 80 through the air circulation flow path 98.

Figure 2:
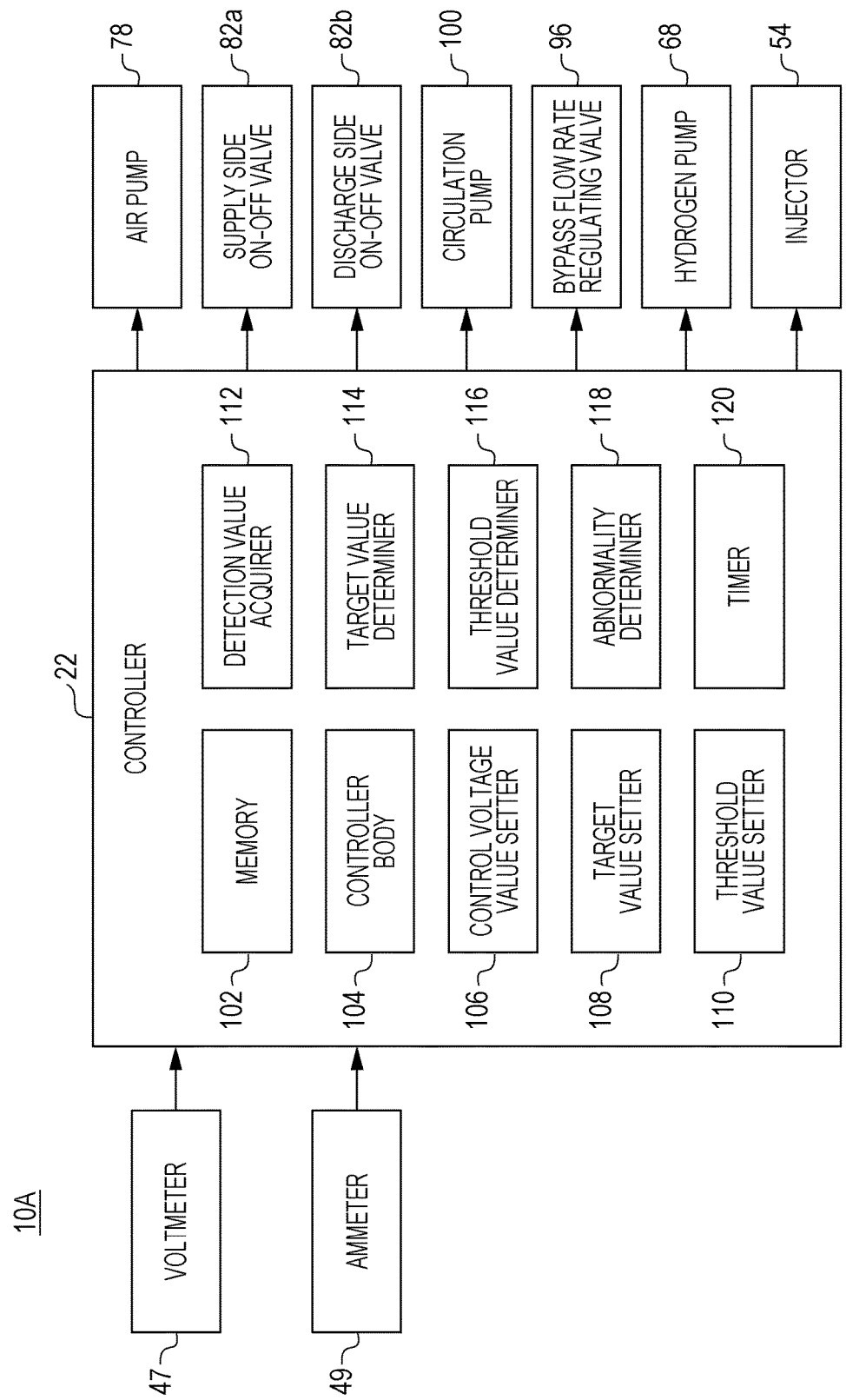
FIG. 2 is a block diagram illustrating the controller of FIG. 1.

In FIG. 2, the controller 22 of the fuel cell system 10A is a well-known computer that includes an I/O interface, a processor, and a memory 102 which are not illustrated. The controller 22 serves as various functional implementation units by causing a processor to execute programs (not illustrated) stored in the memory 102.

The controller 22 has the memory 102, a controller body 104, a control voltage value setter 106, a target value setter 108, a threshold value setter 110, a detection value acquirer 112, a target value determiner 114, a threshold value determiner 116, an abnormality determiner 118, and a timer 120.

The controller body 104 controls the operation of the injector 54, the hydrogen pump 68, the air pump 78, the supply side on-off valve 82a, the discharge side on-off valve 82b, the bypass flow rate regulating valve 96, and the circulation pump 100. In this embodiment, when a shutdown command for the fuel cell 12 is obtained, the controller body 104 continues power generation of the fuel cell stack 12 in a state where supply of air to the cathode side (air flow path 40) of the fuel cell stack 12 is stopped, thereby performing the oxygen consumption processing which consumes the oxygen in the air in the cathode side of the fuel cell stack 12.

The control voltage value setter 106 sets a control voltage value Va when the oxygen consumption processing is performed. Specifically, the control voltage value setter 106 pre-stores in the memory 102 the output power value of the fuel cell stack 12 when the oxygen consumption processing of the fuel cell system 10A is properly performed, then sets the control voltage value Va by referring to the output power value stored in the memory 102.

The target value setter 108 sets a target current value Ia in the oxygen consumption processing. The threshold value setter 110 sets a current threshold value Ib in the oxygen consumption processing. The detection value acquirer 112 regularly receives detection values of the ammeter 49 and the voltmeter 47, and stores the detection values in the memory 102.

The target value determiner 114 determines whether or not the output current value I is decreased to the target current value Ia in a period until a predetermined time elapses after the target value setter 108 has set the target current value Ia. The threshold value determiner 116 determines whether or not the output current value I has exceeded a threshold value. The abnormality determiner 118 determines whether or not abnormality is present in the oxygen consumption processing based on a result of the determination of the target value determiner 114 and a result of the determination of the threshold value determiner 116.

The operation of thus configured fuel cell system 10A will be described in the following.

In the fuel gas supply device 14, hydrogen gas is supplied from the hydrogen tank 50 to the hydrogen gas supply path 52. The hydrogen gas introduced to the hydrogen gas supply path 52 is supplied to the hydrogen gas inlet 44a of the fuel cell stack 12 through the injector 54 and the ejector 56. The hydrogen gas supplied to the hydrogen gas inlet 44a is introduced to the hydrogen gas flow path 38 and is moved along the hydrogen gas flow path 38, then is supplied to the anode electrode 34 of the electrolyte membrane electrode assembly 26.

In the oxidant gas supply device 16, air is sent to the air supply path 80 by a rotational operation of the air pump 78. The air is supplied to the air inlet 46a of the fuel cell stack 12. The air is introduced to the air flow path 40 through the air inlet 46a, is moved along the air flow path 40, and supplied to the cathode electrode 36 of the electrolyte membrane electrode assembly 26.

Thus, in the electrolyte membrane electrode assembly 26, the hydrogen gas supplied to the anode electrode 34 and the oxygen in the air supplied to the cathode electrode 36 are consumed by an electrochemical reaction in an electrode catalyst layer, and power is generated.

Next, the hydrogen gas, which has been supplied to and partially consumed in the anode electrode 34, is discharged as hydrogen exhaust gas to the hydrogen gas discharge path 62 through the hydrogen gas outlet 44b. The hydrogen exhaust gas is introduced from the hydrogen gas discharge path 62 to the hydrogen circulation flow path 66, and is circulated to the hydrogen gas supply path 52 by a suction operation of the ejector 56. The hydrogen exhaust gas discharged to the hydrogen gas discharge path 62 is emitted (purged) to the outside as necessary by a release operation of the purge valve 72.

Similarly, the air, which has been supplied to and partially consumed in the cathode electrode 36, is discharged to the air discharge path 90 through the air outlet 46b. The air humidifies new air supplied from the air supply path 80 through the humidifier 84, and is discharged to the diluter 93 after the pressure of the air is regulated to the set pressure of the back pressure valve 92. It is to be noted that the air discharged to the air discharge path 90 is circulated to the air supply path 80 through the air circulation flow path 98 as necessary by the operation of the circulation pump 100.

Figure 6:
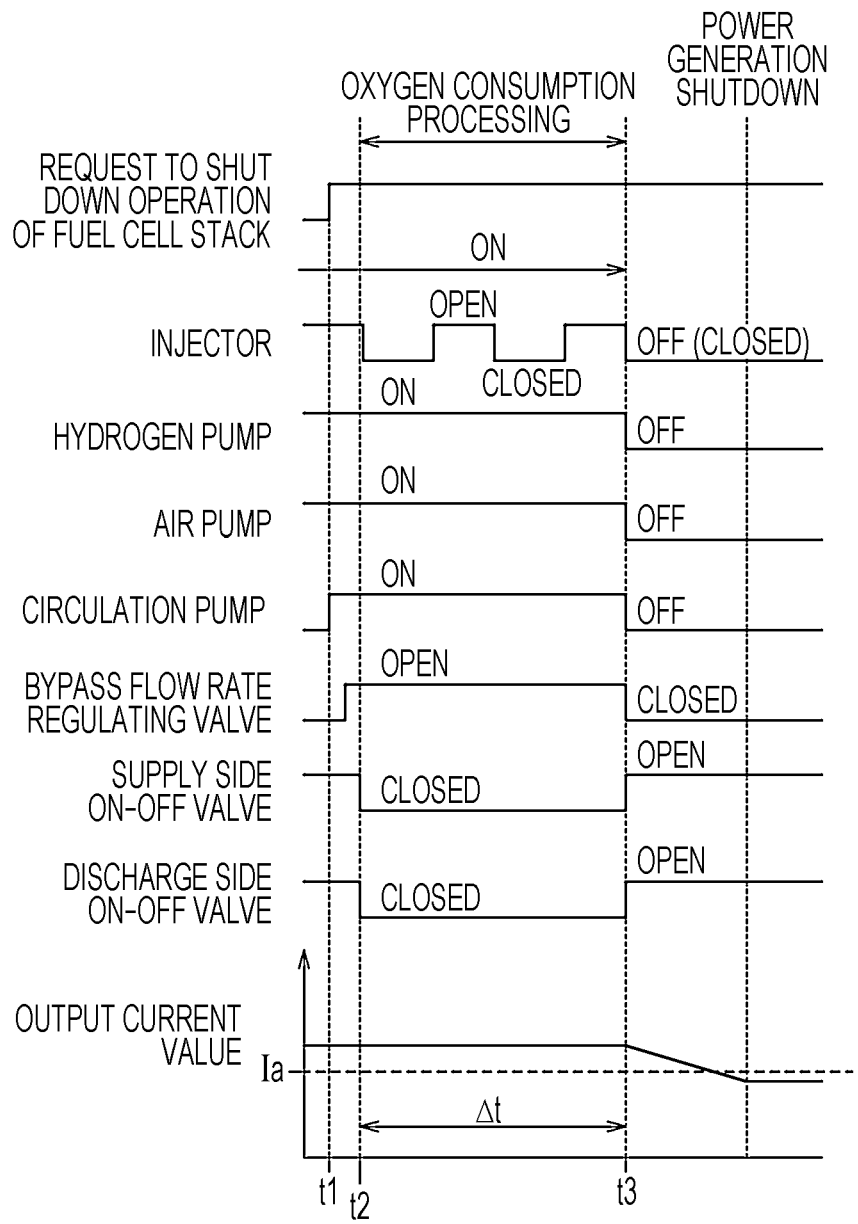
FIG. 6 is a first timing chart illustrating an example in which the oxygen consumption processing is shut down.
Figure 7:
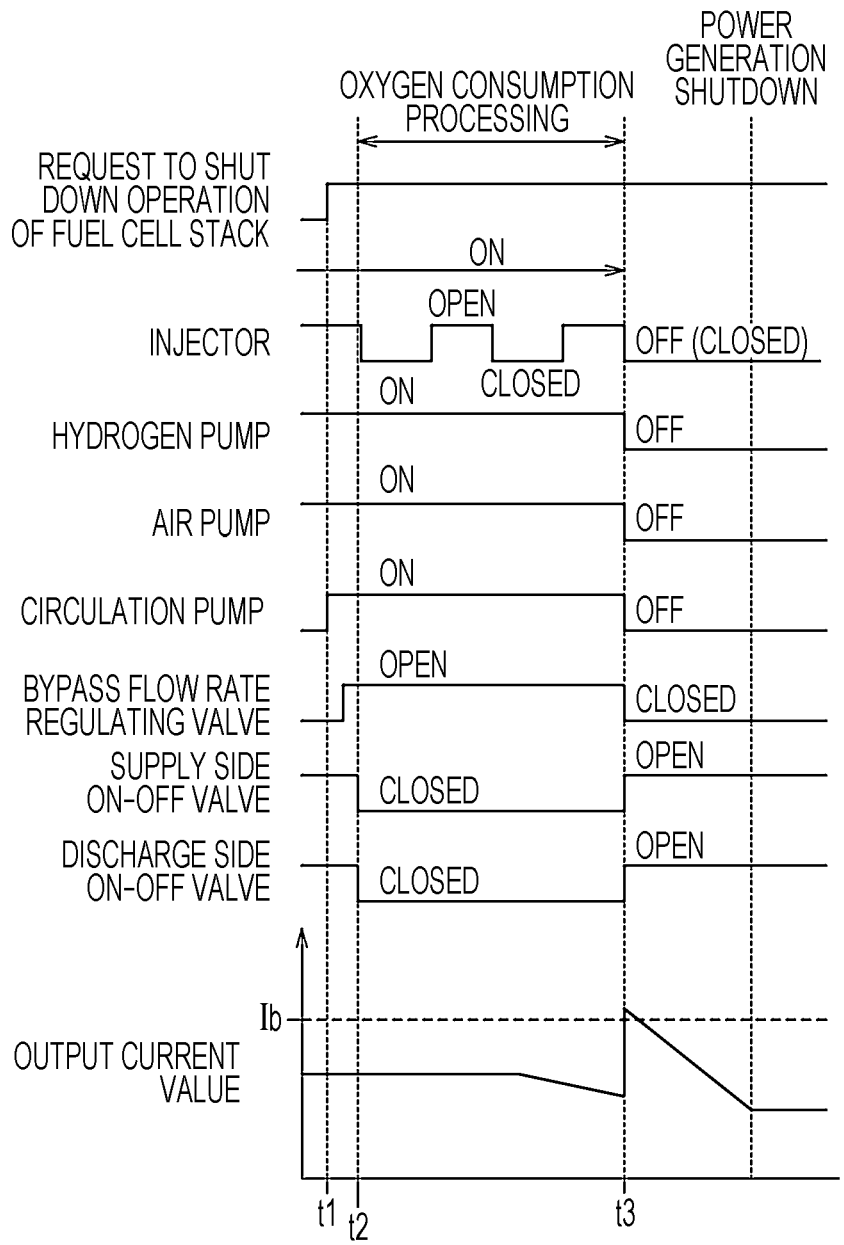
FIG. 7 is a second timing chart illustrating an example in which the oxygen consumption processing is shut down.

Next, a method of shutting down the fuel cell system 10A according to this embodiment will be described with reference to the flowcharts illustrated in FIGS. 3 and 4 and the timing charts illustrated in FIGS. 5 to 7 in the following. It is to be noted that the timing chart of FIG. 5 illustrates an example in which the oxygen consumption processing is completed without being shut down, and the timing charts of FIGS. 6 and 7 illustrate an example in which the oxygen consumption processing is shut down.

Figure 5:
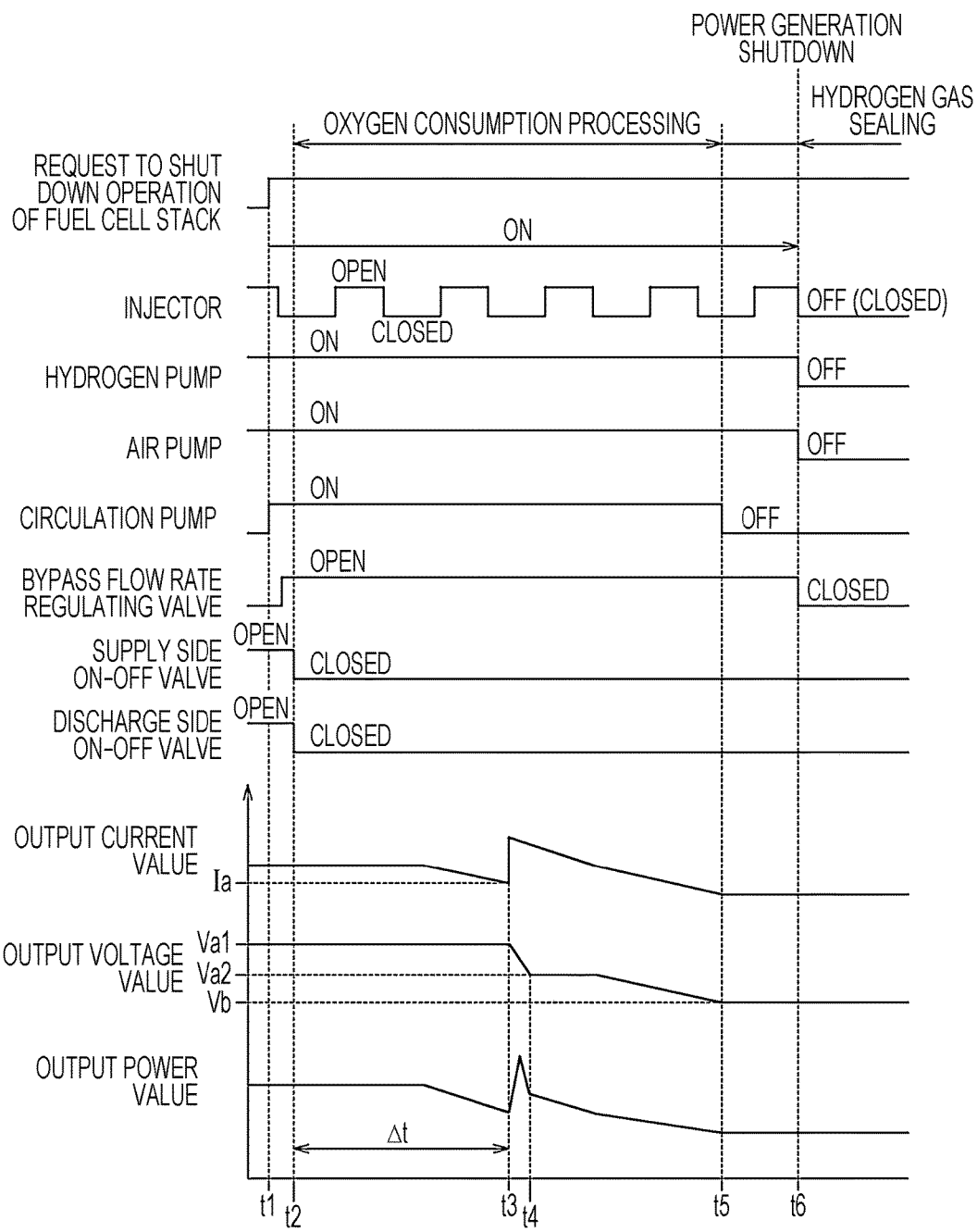
FIG. 5 is a timing chart illustrating an example in which the oxygen consumption processing is completed without being shut down.

It is assumed that immediately before shutdown of the fuel cell system 10A is started, the injector 54 is opened, the hydrogen pump 68 is driven, the air pump 78 is driven, each of the supply side on-off valve 82a, the discharge side on-off valve 82b and the back pressure valve 92 is opened, the circulation pump 100 is stopped, and the bypass flow rate regulating valve 96 is closed (see FIG. 5).

Figure 3:
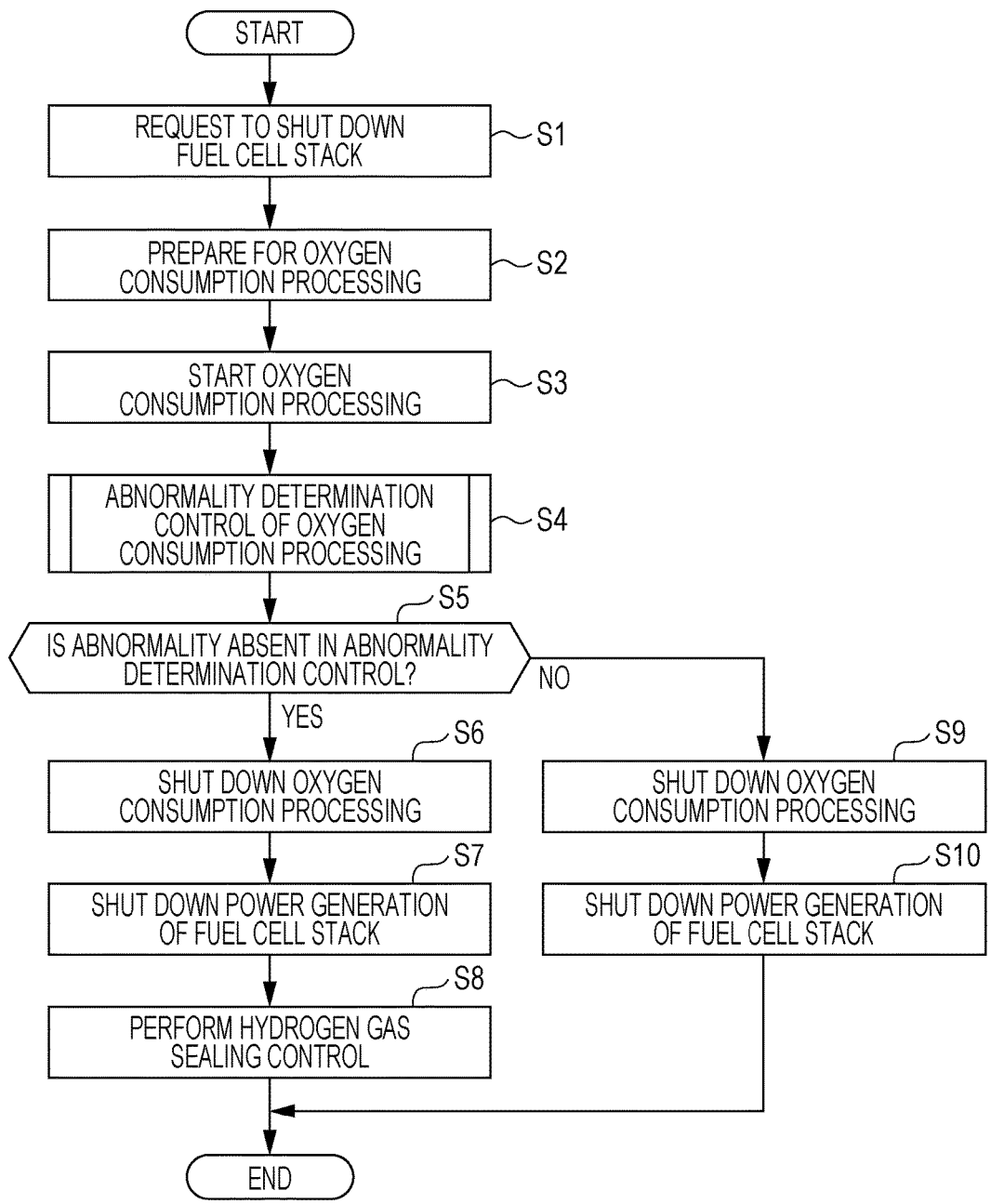
FIG. 3 is a flowchart illustrating a method of shutting down the fuel cell system of FIG. 1.

For instance, as illustrated in FIG. 3, when an ignition switch (IG) is turned off and a request is made to shut down the fuel cell system 10A (step S1), in step S2, preparation step for oxygen consumption processing is performed (see time t1 of FIG. 5).

In the preparation step for the oxygen consumption processing, the controller body 104 outputs a drive command to the circulation pump 100, and outputs a valve open command to the bypass flow rate regulating valve 96. In addition, the controller body 104 outputs a valve open command to the supply side on-off valve 82a and the discharge side on-off valve 82b. Thus, the air introduced from the air pump 78 to the air supply path 80 is introduced to the diluter 93 via the bypass flow path 94. That is, supply of new air from the air pump 78 to the cathode side of the fuel cell stack 12 is stopped.

Consequently, the discharge air, introduced from the air flow path 40 to the air discharge path 90 through the air outlet 46b by the operation of the circulation pump 100, is circulated to the air flow path 40 through the air circulation flow path 98, the air supply path 80, and the air inlet 46a.

Also, the hydrogen exhaust gas, introduced from the hydrogen gas flow path 38 to the hydrogen gas discharge path 62 through the hydrogen gas outlet 44b by the operation of the hydrogen pump 68, is circulated to the hydrogen gas flow path 38 through the hydrogen circulation flow path 66, the ejector 56, the hydrogen gas supply path 52, and the hydrogen gas inlet 44a. It is to be noted that in this process, a retaining valve (not illustrated) of the hydrogen tank 50 is opened, and the injector 54 is driving.

Then, in step S3, the hydrogen exhaust gas which moves along the hydrogen gas flow path 38 and the oxygen in the air which moves along the air flow path 40 are consumed by an electrochemical reaction to continue power generation, and oxygen consumption processing, which consumes the oxygen in the air flow path 40 of the fuel cell stack 12, is started (see time t2 of FIG. 5).

Subsequently, in step S4, the abnormality determiner 118 performs abnormality determination control for the oxygen consumption processing. Specifically, in step S20 of FIG. 4, the control voltage value setter 106 sets a control voltage value Va for the fuel cell stack 12 when the oxygen consumption processing is performed (control voltage value setting step). In this process, the control voltage value setter 106 sets the control voltage value Va by referring to the output power value stored in the memory 102.

In other words, the controller 22 performs nearly constant voltage control over the fuel cell stack 12 using the control voltage value Va set by the control voltage value setter 106. Then, power generation is continued by the oxygen consumption processing in a state where the fuel cell stack 12 undergoes the nearly constant voltage control using the control voltage value Va, and thus the output current value I and the output power value are decreased.

Subsequently, in step S21, the target value setter 108 sets a target current value Ia for the fuel cell stack 12 in the oxygen consumption processing based on the control voltage value Va set by the control voltage value setter 106 (target value setting step). Also, in step S22, the timer 120 measures elapsed time t after the target value setter 108 has set the target current value Ia.

Then, in step S23, the threshold value setter 110 sets a current threshold value Ib for the fuel cell stack 12 in the oxygen consumption processing based on the control voltage value Va set by the control voltage value setter 106 (threshold value setting step).

Then in step S24, the target value determiner 114 determines whether or not the output current value I of the fuel cell stack 12 has been decreased to the target current value Ia set by the target value setter 108 within a predetermined determination time Δt after the setting of the target current value Ia (target value determination step).

When it is determined by the target value determiner 114 that the output current value I of the fuel cell stack 12 has been decreased to the target current value Ia within a predetermined determination time Δt after the setting of the target current value Ia (YES in step S24, see time t3 of FIG. 5), the flow proceeds to step S25. In step S25, the threshold value determiner 116 determines whether or not the output current value I of the fuel cell stack 12 has been increased to the current threshold value Ib set by the threshold value setter 110 (threshold value determination step).

When it is determined by the threshold value determiner 116 that the output current value I of the fuel cell stack 12 has not been increased to the current threshold value Ib (NO in step S25), the flow proceeds to step S26. In step S26, the controller 22 determines whether or not the output voltage value V is lower than or equal to a reference voltage value Vb.

In step S26, when it is determined by the controller 22 that the output voltage value V is higher than the reference voltage value Vb, the processing in and after step S20 is performed. In step S20 performed for the second time and after, the control voltage value setter 106 sets the currently set control voltage value Va to be lower than the previously set control voltage value Va (for instance, see time t4 of FIG. 5). In short, the control voltage value setter 106 sets the control voltage value Va by decreasing the value Va stepwise. It is to be noted that in FIG. 5, the control voltage value Va set for the first time is denoted by Va1, and the control voltage value Va set for the second time is denoted by Va2.

In step S26, when it is determined by the controller 22 that the output voltage value V is lower than or equal to the reference voltage value Vb (YES in step S26), the flow proceeds to step S27. In step S27, the abnormality determiner 118 determines that abnormality is absent in the oxygen consumption processing.

Like this, when it is determined by the abnormality determination control that abnormality is absent in the oxygen consumption processing (YES in step S5 of FIG. 3), in step S6, the controller body 104 stops the oxygen consumption processing. Specifically, the controller body 104 stops driving the circulation pump 100 (see time t5 of FIG. 5). Thus, in step S7, the power generation of the fuel cell stack 12 is stopped. It is to be noted that the supply side on-off valve 82*a* and the discharge side on-off valve 82*b* are closed.

In this state, in the downstream side of the supply side on-off valve 82*a* on the air supply path 80, that is, the air inlet 46*a*, the air flow path 40, and the air outlet 46*b*, in the upstream side of the discharge side on-off valve 82*b* on the air discharge path 90, and in the air circulation flow path 98 (these flow paths may be collectively referred to as "oxygen consumption flow path (cathode system) 122"), nitrogen (inactive gas) is sealed by consuming oxygen.

Also, the oxygen consumption flow path 122 may have a negative pressure, and air containing oxygen may flow in the oxygen consumption flow path 122, for instance, through the supply side on-off valve 82*a* and the discharge side on-off valve 82*b*. Thus, in step S8, hydrogen gas sealing control is controlled in which hydrogen gas is introduced and sealed to and within the oxygen consumption flow path 122. Specifically, the controller body 104 drives the injector 54 by the power of the battery 20, and supplies hydrogen gas to the hydrogen gas flow path 38 of the fuel cell stack 12. In this process, a retaining valve (not illustrated) of the hydrogen tank 50 may be opened or closed. That is, when the retaining valve is opened, new hydrogen gas is supplied from the hydrogen tank 50 to the hydrogen gas flow path 38. On the other hand, when the retaining valve is closed, hydrogen gas remaining between the hydrogen tank 50 and the injector 54 on the hydrogen gas supply path 52 is supplied to the hydrogen gas flow path 38.

Then, hydrogen gas of the hydrogen gas flow path 38 is introduced (crossed over) to the air flow path 40 via the electrolyte membrane electrode assembly 26, and hydrogen gas is sealed within the oxygen consumption flow path 122. Thus, the oxygen consumption flow path 122 can be maintained in an inactive state. When the hydrogen gas sealing control is completed, the controller body 104 stops driving the injector 54, the hydrogen pump 68, the air pump 78, and the bypass flow rate regulating valve 96 (see time t6 of FIG. 5). In this stage, shutdown of the fuel cell stack 12 is completed.

It is to be noted that when a predetermined time elapses after hydrogen gas has been sealed, for instance, the hydrogen gas in the oxygen consumption flow path 122 may be leaked to the outside through the supply side on-off valve 82*a* and the discharge side on-off valve 82*b*, and as a result, the oxygen consumption flow path 122 (the air flow path 40 of the fuel cell stack 12) may internally have the atmospheric pressure or a negative pressure. Also, the hydrogen gas in the hydrogen gas flow path 38 of the fuel cell stack 12 may be leaked to the outside through the purge valve 72, and as a result, the anode side (hydrogen gas flow path 38) of the fuel cell system 10A may have a negative pressure. For this reason, the hydrogen gas sealing control in step S8 is performed regularly.

Figure 4:
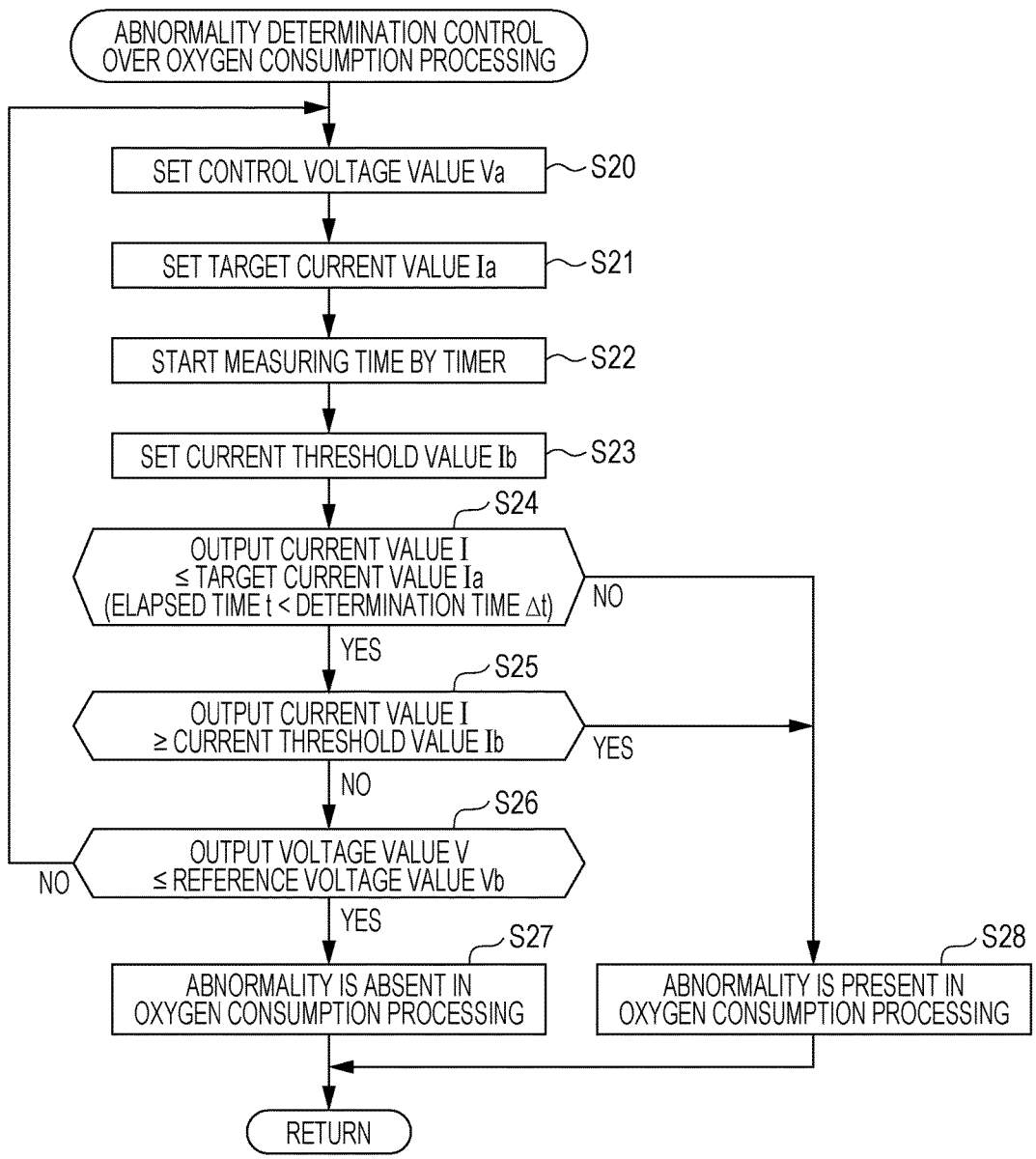
FIG. 4 is a flowchart illustrating determination of abnormality in oxygen consumption processing of FIG. 3.

In step S24 of FIG. 4, when it is determined by the target value determiner 114 that the output current value I of the fuel cell stack 12 has not been decreased to the target current value Ia within a predetermined determination time Δt after the setting of the target current value Ia (see time t3 of FIG. 6), the flow proceeds to step S28 and the abnormality determiner 118 determines that abnormality is present in the oxygen consumption processing.

Such an abnormality may occur for instance in the case where at least one of the supply side on-off valve 82a and the discharge side on-off valve 82b malfunctions, and the external air flows in the oxygen consumption flow path 122. Also, such an abnormality may occur, for instance, when the fuel cell system 10A is used in a low temperature environment. Since IV characteristics are relatively low in a low temperature environment, the amount of consumption of oxygen in the oxygen consumption flow path 122 is less than expected, and the output current value I is relatively high. Even when the oxygen consumption processing is continued in a state where such an abnormality has occurred, it is not possible to consume the oxygen in the oxygen consumption flow path 122 as expected.

Like this, when it is determined by the abnormality determination control that abnormality is present in the oxygen consumption processing (NO in step S5 of FIG. 3), in step S9, the controller body 104 stops the oxygen consumption processing by outputting a valve open command to each of the supply side on-off valve 82a and the discharge side on-off valve 82b. In this case, information indicating that the oxygen consumption processing has been shut down is stored in the memory 102, and when the fuel cell system 10A is started next time, a user is notified of the shutdown of the oxygen consumption processing.

Also, at this point, the controller body 104 outputs a drive stop command to the injector 54, the hydrogen pump 68, the air pump 78, and the circulation pump 100, and outputs a valve close command to the bypass flow rate regulating valve 96. Consequently, the power generation of the fuel cell stack 12 is stopped (step S10). In this stage, shutdown of the fuel cell stack 12 is completed.

In step S25 of FIG. 4, when it is determined by the threshold value determiner 116 that the output current value I has been increased to the current threshold value Ib (see time t3 of FIG. 7), the flow proceeds to step S28 and the abnormality determiner 118 determines that abnormality is present in the oxygen consumption processing.

When such an abnormality occurs, the power generated by the fuel cell stack 12 may exceed the charging capacitor of the battery 20. Thus, in step S9 of FIG. 3, the controller body 104 stops the oxygen consumption processing by outputting a valve open command to each of the supply side on-off valve 82a and the discharge side on-off valve 82b. Also, at this point, the controller body 104 outputs a drive stop command to the injector 54, the hydrogen pump 68, the air pump 78, and the circulation pump 100, and outputs a valve close command to the bypass flow rate regulating valve 96. Consequently, the power generation of the fuel cell stack 12 is stopped (step S10). In this stage, shutdown of the fuel cell stack 12 is completed.

According to this embodiment, when abnormality is present in the oxygen consumption processing, the oxygen consumption processing is shut down. Thus, the power generation of the fuel cell 12 is not continued in a state where oxygen in an amount greater than expected remains in the cathode system (oxygen consumption flow path 122) of the fuel cell stack 12 in which the oxygen consumption processing is performed. Thus, it is possible to protect against deterioration of fuel cell system 10A caused by an abnormal output current value I or output voltage value of the fuel cell stack 12.

In the abnormality determination control of the oxygen consumption processing, the target value setting step and the target value determination step are performed, and when it is determined in the target value determination step that the output current value I has not been decreased to the target current value Ia, it is determined that abnormality is present in the oxygen consumption processing. Thus, it is possible to simply and reliably determine whether abnormality is present in the oxygen consumption processing.

Furthermore, in the abnormality determination control of the oxygen consumption processing, the threshold value setting step and the threshold value determination step are performed, and when it is determined in the threshold value determination step that the output current value I has been increased to the current threshold value Ib, it is determined that abnormality is present in the oxygen consumption processing. Thus, it is possible to simply and reliably determine whether abnormality is present in the oxygen consumption processing.

In this embodiment, when it is determined that abnormality is present in the oxygen consumption processing, the hydrogen gas sealing control is not performed. Therefore, it is possible to stop the oxygen consumption processing and to reduce unnecessary consumption of fuel gas in a state where an inactive state in the fuel cell stack 12 is not maintained.

Also, when it is determined that abnormality is present in the oxygen consumption processing, the controller body 104 outputs a valve open command to the supply side on-off valve 82a and the discharge side on-off valve 82b. Therefore, it is possible to easily detect that inactive gas is not sealed within the cathode side of the fuel cell in a state where shutdown of the fuel cell system 10A is completed. Consequently, the next start of the fuel cell system 10A can be properly made.

Furthermore, in the target value setting step, when the output current value I has been decreased to the target current value Ia, a new target current value Ia lower than the previous target current value Ia is set. In short, in the target value setting step, the target current value Ia is set by decreasing the value Ia stepwise. Consequently it is possible to easily control the oxygen consumption processing and to reliably determine presence of abnormality in the oxygen consumption processing.

This embodiment is not limited to the above-described method of shutting down the fuel cell stack 12. For instance, in step S21, the target value setter 108 may set a target power value instead of the target current value Ia. In this case, in step S24, the target value determiner 114 determines whether or not the output power value of the fuel cell stack 12 has been decreased to the target power value within a predetermined determination time Δt after the setting of the target power value. It is to be noted that the output power value may be obtained from a wattmeter which is not illustrated.

Also, in step S23, the threshold value setter 110 may set a power threshold value of the fuel cell stack 12 in the oxygen consumption processing based on the output voltage value V set by the control voltage value setter 106. In this case, in step S25, the threshold value determiner 116 determines whether or not the output power value of the fuel cell stack 12 has been increased to the power threshold value. Even when a target power value, an output power value, and a power threshold value are used in this manner, the same determination as the above-described abnormality determination in the oxygen consumption processing can be performed.

In steps S2 and S3, when the oxygen consumption processing is performed, the controller body 104 may output a valve open command to the supply side on-off valve 82a, or may output a drive stop command to the circulation pump 100.

(Second Embodiment)

Figure 8:
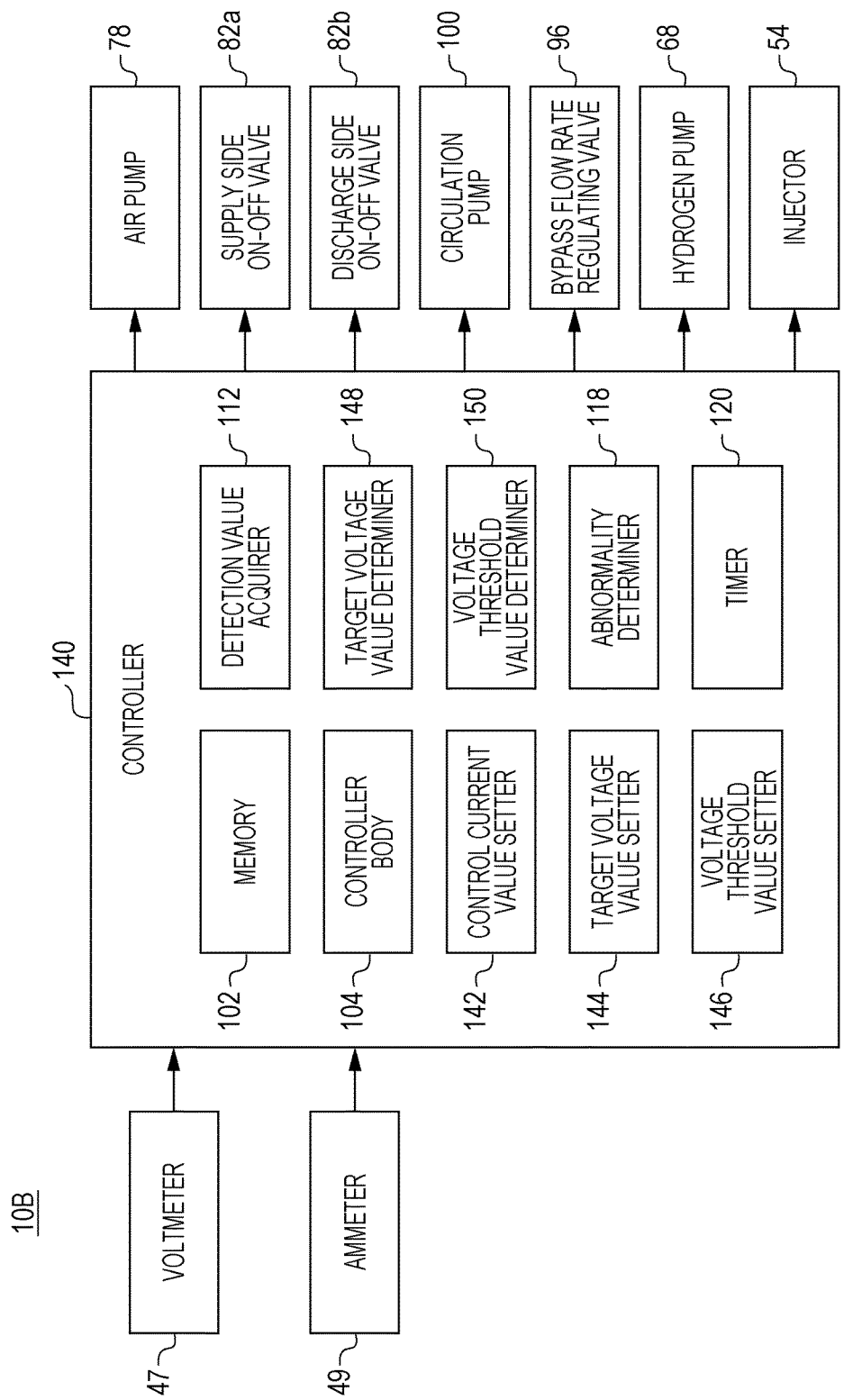
FIG. 8 is a block diagram illustrating a controller of a fuel cell system according to a second embodiment of the present disclosure.

Next, a fuel cell system 10B and a method of shutting down the fuel cell system 10B according to a second embodiment of the present disclosure will be described with reference to FIGS. 8 and 9. It is to be noted that in the fuel cell system 10B according to the second embodiment, the same components as in the fuel cell system 10A according to the above-described first embodiment are labeled with the same reference signs, and a detailed description is omitted.

In the fuel cell system 10B according to this embodiment, instead of the controller 22, a controller 140 is provided. The controller 140 has the memory 102, the controller body 104, a control current value setter 142, a target voltage value setter 144, a voltage threshold value setter 146, the detection value acquirer 112, a target voltage value determiner 148, a voltage threshold value determiner 150, the abnormality determiner 118, and the timer 120.

The control current value setter 142 sets a control current value Ic when the oxygen consumption processing is performed. Specifically, the control current value setter 142 pre-stores in the memory 102 the output power value of the fuel cell stack 12 when the oxygen consumption processing of the fuel cell system 10B is properly performed, then sets the control current value Ic by referring to the output power value stored in the memory 102.

The target voltage value setter 144 sets a target voltage value Vc in the oxygen consumption processing. The voltage threshold value setter 146 sets a voltage threshold value Vd in the oxygen consumption processing. The target voltage value determiner 148 determines whether or not the output voltage value V has been decreased to the target voltage value Vc in a period until a predetermined determination time Δt elapses after the target voltage value setter 144 has set the target voltage value Vc. The voltage threshold value determiner 150 determines whether or not the output voltage value V has exceeded the voltage threshold value Vd.

Next, a method of shutting down the fuel cell system 10B according to this embodiment will be described below with reference to the flowchart illustrated in FIG. 9. It is to be noted that in the method of shutting down the fuel cell system 10B according to the second embodiment, the same steps as in the method of shutting down the fuel cell system 10A according to the above-described first embodiment are labeled with the same reference signs, and a detailed description is omitted.

In the method of shutting down the fuel cell system 10B according to this embodiment, abnormality determination control for the oxygen consumption processing is different from the step described above. Specifically, in step S30, the control current value setter 142 sets the control current value Ic for the fuel cell stack 12 when the oxygen consumption processing is performed (control current value setting step). In this process, the control current value setter 142 sets the control current value Ic by referring to the output power value stored in the memory 102. In other words, the controller 140 performs nearly constant current control over the fuel cell stack 12 using the control current value Ic set by the control current value setter 142.

Next, in step S31, the target voltage value setter 144 sets a target voltage value Vc for the fuel cell stack 12 in the oxygen consumption processing based on the control current value Ic set by the control current value setter 142 (target voltage value setting step). Also, in step S32, the timer 120 measures elapsed time t after the target voltage value setter 144 has set the target voltage value Vc.

Then, in step S33, the voltage threshold value setter 146 sets the voltage threshold value Vd for the fuel cell stack 12 in the oxygen consumption processing based on the target voltage value Vc set by the control current value setter 142 (voltage threshold value setting step).

Then in step S34, the target voltage value determiner 148 determines whether or not the output voltage value V of the fuel cell stack 12 has been decreased to the target voltage value Vc set by the target voltage value setter 144 within a predetermined determination time Δt after the setting of the target voltage value Vc (target voltage value determination step).

When it is determined by the target voltage value determiner 148 that the output voltage value V has been decreased to the target voltage value Vc within a predetermined determination time Δt after the setting of the target voltage value Vc (YES in step S34), the flow proceeds to step S35. In step S35, the voltage threshold value determiner 150 determines whether or not the output voltage value V of the fuel cell stack 12 has been increased to the voltage threshold value Vd set by the voltage threshold value setter 146 (voltage threshold value determination step).

When it is determined by the voltage threshold value determiner 150 that the output voltage value V of the fuel cell stack 12 has not been increased to the voltage threshold value Vd (NO in step S35), the flow proceeds to step S36. In step S36, the controller 140 determines whether or not the output current value I is lower than or equal to a reference current value Id.

In step S36, when it is determined by the controller 140 that the output current value I is higher than the reference current value Id, the processing in and after step S30 is performed. In step S30 performed for the second time and after, the control current value setter 142 sets the currently set control current value Ic to be lower than the previously set control current value Ic. In short, the control current value setter 142 sets the control current value Ic by decreasing the value Ic stepwise.

In step S36, when it is determined by the controller 140 that the output current value I is lower than or equal to the reference current value Id (YES in step S36), the flow proceeds to step S37. In step S37, the abnormality determiner 118 determines that abnormality is absent in the oxygen consumption processing.

In step S34, when it is determined by the target voltage value determiner 148 that the output voltage value V of the fuel cell stack 12 has not been decreased to the target voltage value Vc within a predetermined determination time Δt after the setting of the target voltage value Vc, the flow proceeds to step S38 and the abnormality determiner 118 determines that abnormality is present in the oxygen consumption processing.

Then, in step S35, when it is determined by the voltage threshold value determiner 150 that the output voltage value V has been increased to the voltage threshold value Vd, the flow proceeds to step S38 and the abnormality determiner 118 determines that abnormality is present in the oxygen consumption processing.

According to this embodiment, the same operational effect is provided as in the case where the oxygen consumption processing in the first embodiment is performed. Also, in the abnormality determination control, the target voltage value setting step and the target voltage value determination step are performed, and when it is determined in the target voltage value determination step that the output voltage value V has not been decreased to the target voltage value Vc, it is determined that abnormality is present in the oxygen consumption processing. Thus, it is possible to simply and reliably determine whether abnormality is present in the oxygen consumption processing.

Furthermore, in the abnormality determination control, the voltage threshold value setting step and the voltage threshold value determination step are performed, and when it is determined in the voltage threshold value determination step that the output voltage value V has been increased to the voltage threshold value Vd, it is determined that abnormality is present in the oxygen consumption processing. Thus, it is possible to simply and reliably determine whether abnormality is present in the oxygen consumption processing.

The fuel cell system and the method of shutting down the fuel cell system according to the present disclosure are not limited to the embodiment described above, and it goes without saying that various configurations may be adopted without departing from the gist of the present disclosure.

The present application describes a method of shutting down a fuel cell system including a fuel cell that generates power by an electrochemical reaction between a fuel gas and an oxidant gas, the method including an oxygen consumption processing step of, when a shutdown command for the fuel cell is obtained, performing oxygen consumption processing for consuming oxygen in the oxidant gas remaining in a cathode system of the fuel cell by continuing power generation of the fuel cell, an abnormality determining step of determining presence or absence of abnormality in the oxygen consumption processing based on an output voltage value, an output current value, or an output power value of the fuel cell in the oxygen consumption processing step, and a shutting down step of, when it is determined in the abnormality determining step that abnormality is present in the oxygen consumption processing, shutting down the oxygen consumption processing.

With the method of shutting down a fuel cell system according to the present disclosure, when abnormality is present in the oxygen consumption processing, the oxygen consumption processing is shut down. Thus, power generation of the fuel cell is not continued in a state where oxygen in an amount greater than expected remains in the cathode side of the fuel cell. Thus, it is possible to protect against deterioration of a fuel cell caused by an abnormal output current value or output voltage value of the fuel cell.

In the method of shutting down a fuel cell system, the abnormality determining step may include a target value setting step of setting a target value for the output current value or the output power value, and a target value determining step of determining whether or not the output current value or the output power value has been decreased to the target value in a period until a predetermined determination time elapses after the setting of the target value. Here, when it is determined in the target value determining step that the output current value or the output power value has not been decreased to the target value within the determination time, it may be determined that abnormality is present in the oxygen consumption processing.

With this method, it is possible to simply and reliably determine whether abnormality is present in the oxygen consumption processing.

In the method of shutting down a fuel cell system, the abnormality determining step may include a threshold value setting step of setting a threshold value for the output current value or the output power value, and a threshold value determining step of determining whether or not the output current value or the output power value has been increased to the threshold value. Here, when it is determined in the threshold value determining step that the output current value or the output power value has been increased to the threshold value, it may be determined that abnormality is present in the oxygen consumption processing.

With this method, it is possible to simply and reliably determine whether abnormality is present in the oxygen consumption processing.

In the method of shutting down a fuel cell system, the abnormality determining step may include a target voltage value setting step of setting a target voltage value for the fuel cell, and a target voltage determining step of determining whether or not the output voltage value has been decreased to the target voltage value in a period until a predetermined voltage determination time elapses after the setting of the target voltage value. Here, when it is determined in the target voltage determining step that the output voltage value has not been decreased to the target voltage value within the voltage determination time, it may be determined that abnormality is present in the oxygen consumption processing.

With this method, it is possible to simply and reliably determine whether abnormality is present in the oxygen consumption processing.

In the method of shutting down a fuel cell system, the abnormality determining step may include a voltage threshold value setting step of setting a voltage threshold value for the output voltage value, and a voltage threshold value determining step of determining whether or not the output voltage value has been increased to the voltage threshold value. Here, when it is determined in the voltage threshold value determining step that the output voltage value has been increased to the voltage threshold value, it may be determined that abnormality is present in the oxygen consumption processing.

With this method, it is possible to simply and reliably determine whether abnormality is present in the oxygen consumption processing.

In the method of shutting down a fuel cell system, when execution of the oxygen consumption processing is shut down in the shutting down step, fuel gas sealing control for introducing and sealing the fuel gas to and within the fuel cell may be not performed.

With this method, it is possible to stop the oxygen consumption processing and to reduce unnecessary consumption of fuel gas in a state where an inactive state in the fuel cell is not maintained.

In the method of shutting down a fuel cell system, execution of the oxygen consumption processing may be shut down by outputting a valve open command to an on-off valve for stopping flow of the oxidant gas into the cathode system of the fuel cell, in the shutting down step.

With this method, it is possible to easily detect that inactive gas is not sealed within the cathode side of the fuel cell in a state where shutdown of the fuel cell system is completed. Consequently, the next start of the fuel cell system can be properly made.

In the method of shutting down a fuel cell system, the abnormality determining step may include a control voltage value setting step of setting a control voltage value for the fuel cell in the oxygen consumption processing by decreasing the control voltage value stepwise.

With this method, it is possible to easily control the oxygen consumption processing.

In the method of shutting down a fuel cell system, when it is determined in the target voltage determining step that the output current value or the output power value has been decreased to the target value within the determination time, a new control voltage value lower than the control voltage value may be set, in the control voltage value setting step.

With this method, it is possible to easily control the oxygen consumption processing and to reliably determine presence of abnormality in the oxygen consumption processing.

In the method of shutting down a fuel cell system, the abnormality determining step may include a control current value setting step of setting a control current value for the fuel cell in the oxygen consumption processing by decreasing the control current value stepwise.

With this method, it is possible to easily control the oxygen consumption processing.

In the method of shutting down a fuel cell system, when it is determined in the target voltage determining step that the output voltage value has been decreased to the target voltage value within the voltage determination time, a new control current value lower than the control current value may be set, in the control current value setting step.

With this method, it is possible to easily control the oxygen consumption processing and to reliably determine presence of abnormality in the oxygen consumption processing.

The present application describes a fuel cell system including a fuel cell that generates power by an electrochemical reaction between a fuel gas and an oxidant gas, the fuel cell system including a controller body that, when a shutdown command for the fuel cell is obtained, performs oxygen consumption processing for consuming oxygen in the oxidant gas remaining in a cathode system of the fuel cell by continuing power generation of the fuel cell, a detection value acquirer that acquires an output voltage value, an output current value, or an output power value of the fuel cell in the oxygen consumption processing, and an abnormality determiner that determines presence or absence of abnormality in the oxygen consumption processing based on the output voltage value, the output current value, or the output power value acquired by the detection value acquirer. Here, when it is determined by the abnormality determiner that that abnormality is present in the oxygen consumption processing, the controller body shuts down execution of the oxygen consumption processing.

The fuel cell system in the present disclosure provides the same operation effect as that of the above-described method of shutting down a fuel cell system.

According to the present disclosure, when abnormality is present in the oxygen consumption processing, execution of the oxygen consumption processing is shut down. Thus, it is possible to protect against deterioration of the fuel cell caused by continued power generation of the fuel cell in a state where oxygen in an amount greater than expected remains in the cathode side of the fuel cell.

Obviously, numerous modifications and variations of the present invention are possible in light of the above teachings. It is therefore to be understood that within the scope of the appended claims, the invention may be practiced otherwise than as specifically described herein.

What is claimed is:

1. A method of shutting down a fuel cell system including a fuel cell, comprising:
   generating power via an electrochemical reaction between a fuel gas and an oxidant gas;
   outputting a shutdown command to the fuel cell to stop generating power;
   controlling the fuel cell to supply the fuel gas and to continue generating power during an oxygen consumption process to consume oxygen in the oxidant gas circulating in a cathode system of the fuel cell even when the shutdown command is output to the fuel cell;
   detecting at least one of voltage, current, and power output from the fuel cell during the oxygen consumption process;
   determining whether an abnormality occurs during the oxygen consumption process based on at least one of the voltage, the current, and the power; and
   controlling the fuel cell to stop generating power during the oxygen consumption process when it is determined that abnormality occurs.

2. A fuel cell system comprising:
   a fuel cell to generate power via an electrochemical reaction between a fuel gas and an oxidant gas;
   at least one detector to detect at least one of voltage, current, and power output from the fuel cell during an oxygen consumption process; and
   circuitry configured to
      output a shutdown command to the fuel cell to stop generating power;
      control the fuel cell to supply the fuel gas and to continue generating power during the oxygen consumption process to consume oxygen in the oxidant gas circulating in a cathode system of the fuel cell even when the circuitry outputs the shutdown command to the fuel cell;
      determine whether an abnormality occurs during the oxygen consumption process based on at least one of the voltage, the current, and the power; and
      control the fuel cell to stop generating power during the oxygen consumption process when the circuitry determines that abnormality occurs.

3. A method of shutting down a fuel cell system including a fuel cell, comprising:
   generating power via an electrochemical reaction between a fuel gas and an oxidant gas;
   outputting a shutdown command to the fuel cell to stop generating power;
   controlling the fuel cell to continue generating power during an oxygen consumption process to consume oxygen in the oxidant gas remaining in a cathode system of the fuel cell even when the shutdown command is output to the fuel cell;
   detecting at least one of voltage, current, and power output from the fuel cell during the oxygen consumption process;
   determining whether an abnormality occurs during the oxygen consumption process based on at least one of the voltage, the current, and the power;
   controlling the fuel cell to stop generating power during the oxygen consumption process when it is determined that abnormality occurs;
   setting a target value for the current or the power,
   wherein it is determined that the abnormality occurs during the oxygen consumption process when the current or the power detected has not been decreased to the target value within a determination time after the target value is set.

4. The method according to claim 1, further comprising:
setting a threshold value for the current or the power,
wherein it is determined that the abnormality occurs during the oxygen consumption process when the current or the power detected has been increased to the threshold value.

5. The method according to claim 1, further comprising:
setting a target value for the voltage,
wherein it is determined that the abnormality occurs during the oxygen consumption process when the voltage detected has not been decreased to the target value within a voltage determination time after the target value is set.

6. The method according to claim 1, further comprising:
setting a threshold value for the voltage,
wherein it is determined that the abnormality occurs during the oxygen consumption process when the voltage has been increased to the voltage threshold value.

7. The method according to claim 1,
wherein when the fuel cell is controlled to stop generating power, fuel gas sealing control for introducing and sealing the fuel gas to and within the fuel cell is not performed.

8. The method according to claim 1,
wherein the oxygen consumption processing is stopped by outputting a valve open command to an on-off valve for stopping flow of the oxidant gas into the cathode system of the fuel cell.

9. The method according to claim 3, further comprising:
setting a control voltage value for the fuel cell in the oxygen consumption processing such that the control voltage value decreases stepwise.

10. The method according to claim 9,
wherein when the current or the power detected has been decreased to the target value within the determination time, a new control voltage value lower than the control voltage value is set.

11. The method according to claim 5, further comprising:
setting a control current value for the fuel cell in the oxygen consumption processing such that the control current value decreases stepwise.

12. The method according to claim 11,
wherein when the voltage detected has been decreased to the target voltage value within the voltage determination time, a new control current value lower than the control current value is set.

* * * * *